United States Patent
Mao et al.

(10) Patent No.: US 12,210,485 B2
(45) Date of Patent: Jan. 28, 2025

(54) MANAGEMENT OF CONTENT

(71) Applicant: Comcast Cable Communications, LLC, Philadelphia, PA (US)

(72) Inventors: Weidong Mao, West Windsor, NJ (US); Elad Nafshi, Bryn Mawr, PA (US); Mark A. Vickers, Marina del Rey, CA (US); Gregory A. Broome, Broomfield, CO (US); Sree Kotay, Philadelphia, PA (US); Bruce Bradley, Wayne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/373,352

(22) Filed: Jul. 12, 2021

(65) Prior Publication Data
US 2022/0179831 A1 Jun. 9, 2022

Related U.S. Application Data

(63) Continuation of application No. 14/173,466, filed on Feb. 5, 2014, now Pat. No. 11,100,051.
(Continued)

(51) Int. Cl.
*G06F 16/174* (2019.01)
*G06F 16/13* (2019.01)
*G06F 16/176* (2019.01)

(52) U.S. Cl.
CPC ........ *G06F 16/1748* (2019.01); *G06F 16/137* (2019.01); *G06F 16/1752* (2019.01); *G06F 16/176* (2019.01)

(58) Field of Classification Search
CPC .......... G06F 17/3015; G06F 17/30156; G06F 17/30194; G06F 17/30283;
(Continued)

(56) References Cited

U.S. PATENT DOCUMENTS 7,555,196 B1 * 6/2009 Crawford ........... H04N 21/4325
370/537
8,112,505 B1 * 2/2012 Ben-Shaul .......... G06F 16/1767
709/219
(Continued)

FOREIGN PATENT DOCUMENTS

WO 2013164233 A1 7/2013

OTHER PUBLICATIONS

IEEE 100: The Authoritative Dictionary of IEEE Standards Terms. Seventh edition. Standards Information Network IEEE Press, 2000, pp. 936-937.

*Primary Examiner* — James E Richardson
(74) *Attorney, Agent, or Firm* — Ballard Spahr LLP

(57) ABSTRACT

Methods and system for content delivery, access, and storage are disclosed. In one aspect, an example method can comprise receiving a content item. The content item can comprise a plurality of fragments. An example method can comprise determining an identifier for each of the plurality of fragments, and generating an index file comprising the determined identifiers. An example method can comprise associating the index file with the content item. Additionally, an example method can comprise storing the content item and the index file. An example method can also comprise performing a de-duplication operation. For example, the de-duplication operation can be performed on one or more unique files to create a master file.

20 Claims, 9 Drawing Sheets

Related U.S. Application Data

(60) Provisional application No. 61/787,628, filed on Mar. 15, 2013.

(58) Field of Classification Search
CPC ........... G06F 17/30575; G06F 17/0641; G06F 17/30091; G06F 11/1453; G06F 11/20945; G06F 16/137; G06F 16/1748; G06F 16/1752; G06F 16/176

See application file for complete search history.

(56) References Cited

U.S. PATENT DOCUMENTS

| | | |
|---|---|---|
| 8,266,115 B1 | 9/2012 | Park et al. |
| 8,370,297 B2 | 2/2013 | Anglin et al. |
| 9,223,793 B1 | 12/2015 | Mahalingam et al. |
| 9,244,623 B1 | 1/2016 | Bent et al. |
| 2005/0131902 A1* | 6/2005 | Saika .................... G06F 16/10 |
| 2006/0080167 A1* | 4/2006 | Chen ................. G06Q 30/0272 |
| | | 705/14.68 |
| 2008/0092168 A1 | 4/2008 | Logan et al. |
| 2009/0113491 A1 | 4/2009 | Kuether et al. |
| 2009/0204650 A1 | 8/2009 | Wong et al. |
| 2010/0030791 A1* | 2/2010 | Iverson ............... G06F 16/1737 |
| | | 713/320 |
| 2010/0082700 A1 | 4/2010 | Parab |
| 2010/0094817 A1 | 4/2010 | Ben-Shaul et al. |
| 2010/0250501 A1 | 9/2010 | Mandagere et al. |
| 2011/0145207 A1 | 6/2011 | Agrawal et al. |
| 2012/0047324 A1 | 2/2012 | Wideman |
| 2012/0158671 A1 | 6/2012 | Tzur et al. |
| 2012/0158675 A1 | 6/2012 | Gupta et al. |
| 2012/0166401 A1 | 6/2012 | Li et al. |
| 2012/0166448 A1 | 6/2012 | Li et al. |
| 2012/0210382 A1 | 8/2012 | Walker et al. |
| 2012/0239691 A1 | 9/2012 | Jaquette |
| 2012/0303766 A1* | 11/2012 | McGowan ....... H04N 21/26258 |
| | | 709/219 |
| 2013/0013567 A1 | 1/2013 | Constantinescu et al. |
| 2013/0060739 A1 | 3/2013 | Kalach et al. |
| 2013/0117418 A1 | 5/2013 | Mutton et al. |
| 2013/0144845 A1 | 6/2013 | Ghuge et al. |
| 2013/0145415 A1 | 6/2013 | Major et al. |
| 2014/0074794 A1 | 3/2014 | Chavda et al. |
| 2014/0165116 A1 | 6/2014 | Major et al. |
| 2014/0195495 A1 | 7/2014 | Akirav et al. |
| 2014/0245334 A1 | 8/2014 | Belyaev et al. |
| 2014/0279852 A1* | 9/2014 | Chen ...................... G06F 16/43 |
| | | 707/696 |

* cited by examiner

MANAGEMENT OF CONTENT

CROSS REFERENCE TO RELATED PATENT APPLICATIONS

This application is a continuation of U.S. Non-Provisional application Ser. No. 14/173,466, which was filed on Feb. 5, 2014, and claims priority to U.S. Provisional Application No. 61/787,628, which was filed Mar. 15, 2013, each of which are incorporated by reference in their entireties herein.

BACKGROUND

The increased usage of small, portable devices and wireless networks allows users to take such devices to a variety of locations. Some users may wish to access content from a variety of devices in these locations, and may request a third party to store content for the users. In some cases, users may request to store the same content as another user. As multiple requests to store the same content are processed, an increasing amount of storage space and network bandwidth can be wasted with the storage and transmission of duplicate information. Accordingly, there is a need for more sophisticated systems and methods for content storage and delivery.

SUMMARY

It is to be understood that both the following general description and the following detailed description are exemplary and explanatory only and are not restrictive, as claimed. Provided are methods and systems for content storage and delivery. In one aspect of an example method, a content item can be received. The content item can comprise a plurality of fragments. In another aspect, an identifier can be determined for each of the plurality of fragments. An index file comprising the determined identifiers can be generated and the index file can be associated (e.g., through a list or database) with the content item. The content item and the index file can be stored. Furthermore, a de-duplication operation can be performed. De-duplication can comprise, for example, removing duplicate content or portions thereof.

In an aspect of another example method, a plurality of master files can be stored at a first node. A de-duplication operation can be performed on the plurality of master files at the first node or before the file reaches the first node. A request for a file can be received and it can be determined if one of the plurality of master files matches the requested file. The matching master file can be distributed to a second node. Additionally, the master file can be processed to become one or multiple unique files.

In one aspect, an example system can comprise a master node. The master node can be configured for receiving a content item. The content item can comprise a plurality of fragments. Additionally, the master node can be configured for determining an identifier for each of the plurality of fragments, generating an index file comprising the determined identifiers, associating the index file with the content item, and storing the content item and the index file. In one aspect, an example system can comprise an edge node coupled to the master node. The edge node can be configured for receiving a request to consume the content item and retrieving the index file from the master node. Furthermore, the system can provide the index file in response to the request and receive a request for one of the plurality of fragments identified in the index file. The system can compare the identifier of the requested fragment with identifiers of fragments stored at the edge node, provide the requested fragment if present at the edge node, and retrieve the requested fragment from the master node if not present at the edge node. In one aspect, an example system can comprise a de-duplication unit configured for performing a de-duplication operation at one or more of the master node or the edge node.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
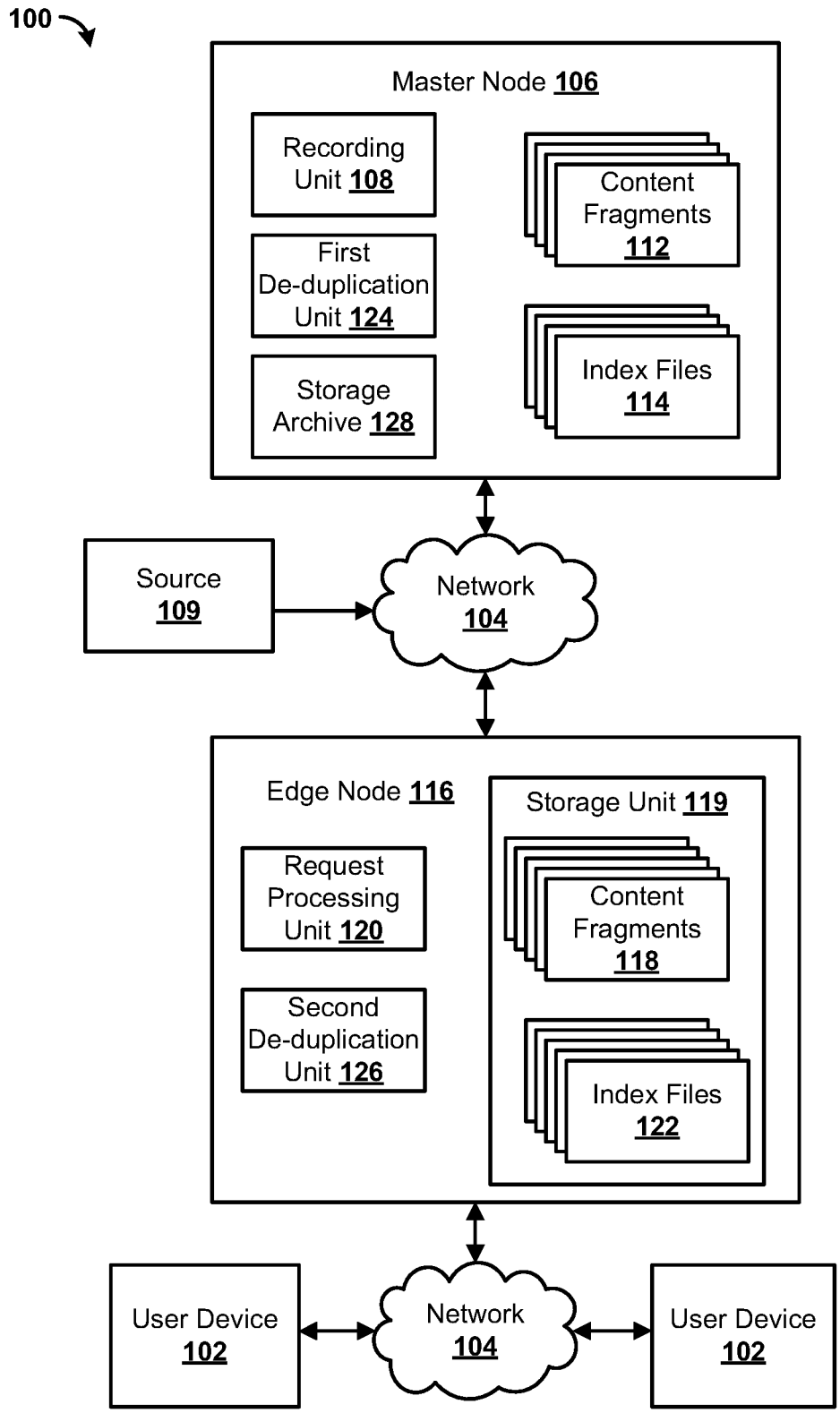
FIG. 1 is a block diagram illustrating an example system for content delivery.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed, while specific reference of each various individual and collective combinations and permutation of these may not be explicitly disclosed, each is specifically contemplated and described herein for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized, including hard disks, CD-ROMs, optical storage devices, solid state memory, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for content delivery. As a general overview, content can be recorded on master devices and/or edge devices for a variety of users. Content can be managed through de-duplication operations. As content is requested from users, content can be retrieved by accessing index files identifying content fragments on the master devices and/or edge devices. Those skilled in the art will appreciate that present methods may be used in systems that employ both digital and analog equipment. One skilled in the art will appreciate that provided herein is a functional description and that the respective functions can be performed by software, hardware, or a combination of software and hardware. In an exemplary embodiment, the methods and systems disclosed can be located within one or more master nodes, and/or edge nodes. For example, the methods and systems can be performed in the recording unit, request processing unit, de-duplication units, storage unit, storage archive, and index files described in greater detail below.

FIG. 1 is a block diagram illustrating an example system 100 for providing content. In one aspect, the system 100 can comprise one or more user devices 102. The user devices 102 can comprise, for example, a home communications terminal, set top box, digital video recorder, digital streaming device, television, satellite device, computer workstation, laptop device, tablet device, mobile device, smart phone, smart television, game machine and the like. The user device 102 can be configured to receive and display content for a user of the user device 102. The user device 102 can be configured to receive content through a packet switched network (e.g., internet protocol (IP) based network) and/or a non-packet switched network (e.g., a quadrature amplitude modulation (QAM) based network). For example, the user device 102 can be located in a network 104. In an aspect, the location of the user device 102 is not fixed. By way of example, a user can receive content from the network 104 on a mobile device, such as a laptop computer, PDA, smartphone, GPS, vehicle entertainment system, portable media player, tablet device, and the like.

The network 104 can comprise network adapters, switches, routers, and the like connected through wireless links (e.g., radio frequency, satellite) or physical links (e.g., fiber optic cable, coaxial cable, Ethernet cable). In one aspect, the network 104 can be configured to provide communication from telephone, cellular, modem, and/or other electronic devices to and throughout the system 100. The network 104 can comprise a content distribution network and/or an access network. The content distribution network 104 can comprise a quadrature amplitude modulation based network and/or and internet protocol based network to deliver content to a plurality of user devices 102. In one aspect, the user devices 102 can roam from one kind of network to another without interruption of service. For example, a user device 102 can transition from a first network (e.g., wireless cellular data network) to a second network (e.g., wireless local network). In one aspect, the network 104 can comprise the first network and the second network.

In one aspect, the system 100 can comprise a master node 106. The master node 106 can be located in the network 104. The master node 106 can comprise a recording unit 108 configured to record data, such as content, received from a data source, such as content source 109. For example, the content source 109 can provide a content stream, such as a QAM or IP based stream. The content stream can comprise one or more content items (e.g., shows, programs). The content stream can comprise one or more video streams and, in some cases, one or more audio streams. Additionally, the content stream can comprise one or more data streams. The content stream can comprise, for example, an MPEG Transport Stream (e.g., MPEG-1, MPEG-2, MPEG-4, and the like). The content stream can comprise content and other data transmitted in packets associated with a particular content item. In one aspect, each content item can be divided (e.g., for storage and transmission) into a plurality of content fragments. Accordingly, the recording unit 108 can be configured to store the content as a first plurality of fragments 112. As another example, the content source 109 can be configured to provide all or a portion of a content item as a single file transfer. For example, a transferred file can comprise the first plurality of fragment 112 packaged as a single file. The transferred file can comprise one or more content items or a portion of a content item.

In one aspect, the recording unit 108 can determine an identifier for one or more of the first plurality of fragments 112. For example, one or more of the identifiers can be a unique hash value generated based on the data stored in the corresponding fragment. The hash values can be generated based on a hash function. In one aspect, the hash function can be a collision resistant hash function. The identifier can be generated based on, for example, MD5 Message Digest algorithm, SHA-2, SHA-3 and the like. Additionally, the recording unit 108 can generate an index file comprising the determined identifiers. The index file can be stored on a network, such as on the master node 116. As an example, the index file can be stored with other index files 114 on the master node 106. In one aspect, the index file can comprise information for accessing fragments in a variety of formats and locations. In another aspect, the recording unit 108 can associate the index file with a particular content item of the content stream (e.g., or transferred file). In one aspect, the index file can be associated with a particular user (e.g., subscriber) requesting the content item to be recorded. In another aspect, the recording unit 108 can generate an index file for each of a plurality of bit-rates (e.g., or transferred files) for a particular content item. The recording unit 108 can generate the index file incrementally. For example, after each fragment is received, the recording unit 108 can add an entry in the index file relating to the received fragment.

As a further illustration, the recording unit 108 can receive an instruction from the user device 102 requesting the system 100 to record some or all of a content item in a content stream or a file transfer from the content source 109. The recording unit 108 can identify fragments in the content stream or file transfer related to the requested content item and store the fragments at the master node 106. For example, the recording unit 108 can record one portion of the content item for a first user. The recording unit 108 can record another portion of the content item for a second user. The recording unit 108 can record the complete content item for a third user.

In another aspect, the recording unit 108 can record some or all of a content item based on a prediction. For example, a content item can be recorded and stored before a request is received or accessed from a user. The request can comprise an instruction to store at least a portion of the content item. For example, a certain portion of a current content channel or file transfer of the user can be stored to enable manipulation (e.g., rewind, fast forward) of the content. Additionally, content can be stored predictively based on a user history, user preferences, demographics, and/or other information.

In one aspect, the system 100 can comprise an edge node 116. The edge node 116 can be located in the network 104. The edge node 116 can be communicatively coupled to the master node 106 through the network 104 (e.g., between the master node 106 and user device 102). Though one master node 106 and edge node 116 are shown in FIG. 1, it should be understood that other master nodes 106 and edge nodes 116 can be located in the network 104. For example, a master node 106 can be communicatively coupled to several edge nodes 116. The master nodes 106 and the edge nodes 116 can be located at a variety of geographic locations. It should also be noted that other intermediary devices and/or nodes can be located in the network 104 between the master node 106, edge node 116, and user devices 102. In one aspect, the edge node 116 can comprise a storage unit 119 configured to store a second plurality of fragments 118 of content. For example, the storage unit 119 can receive fragments of content recorded from the recording unit 108 of the master node 106. The fragments can together comprise one or more portions of the content and/or a complete content item. In some implementations, the recording unit 108 can be located at the edge node 116 in addition to or instead of being located at the master node 106. In such implementations, the recording unit 108 can directly store the recorded fragments at the edge node 116 and/or the master node 106.

In one aspect, the edge node 116 can comprise a request processing unit 120. The request processing unit 120 can receive requests to store, record, and/or deliver (e.g., for consumption) particular content items. The requests can be received from the user devices 102. In one aspect, the requests can be for a portion of a content item (e.g., the recorded portion) or for the complete content item. Upon receiving a request, the request processing unit 120 can retrieve an index file. The index file can be associated with content (e.g., fragments of content) indicated by the request. In one aspect, an index file can be retrieved from the master node 106. For example, the request processing unit 120 can retrieve one or more of the index files 114 located on the master node 106. Alternatively, the index file can be retrieved from index files 122 stored on the edge node 116. The index file can be an index file associated with a particular user and/or a particular copy of the recorded content requested by the user. In one aspect, the request processing unit 120 can provide the index file (e.g., to the user device 102) in response to the request. In another aspect, the request processing unit 120 can provide a manifest file generated based on the index file to a user device 102. The manifest file can provide information for accessing fragments in a specified format (e.g. file type, compression type, stream type, and the like).

Accordingly, a user device 102 can receive and process (e.g., read) the index file or manifest file. The user device 102 can identify one or more of the plurality of fragments identified in the index file or manifest file. Then, the request processing unit 120 can receive a request (e.g., from the user device 102) for one or more of the plurality of fragments identified in the index file or manifest file. The request processing unit 120 can locate the fragments from the request. For example, the request processing unit 120 can compare an identifier of the requested fragment with identifiers of fragments stored at the edge node 116. If the request processing unit 120 locates the requested fragment at the edge node 116, then the requested fragment can be provided to the user device 102 from the edge node 116. Additionally, the request processing unit 120 can locate the requested fragment on the master node 106. Thus, the request processing unit 120 can retrieve the requested fragment from the master node 106 and provide the requested fragment to the user device 102.

In one aspect, the system 100 can comprise one or more de-duplication units 124 and 126 configured to perform a de-duplication operation. For example, the master node 106 can comprise a first de-duplication unit 124. Additionally, the edge node 116 can comprise a second de-duplication unit 126. Furthermore, other de-duplication units can be located throughout the network (e.g., other edge nodes 116 or at the user devices 102). For example, a de-duplication unit can be located at a home gateway, customer premise equipment, digital video recording on the user device 102, or other device with the user. The first de-duplication unit 124 can perform a de-duplication operation at the master node 106. For example, the first de-duplication unit 124 can perform the de-duplication operation on a content item. For example, the first de-duplication unit 124 can perform the de-duplication operation on the first plurality of fragments 112 of content associated with the content item. In another aspect, the second de-duplication unit 126 can perform a de-duplication operation at the edge node 116. The second de-duplication unit 126 can perform the de-duplication operation on a content item. For example, the second de-duplication unit 126 can perform the de-duplication operation on the second plurality of fragments 118 associated with the content item at the edge node 116. In one aspect, when the de-duplication operation is performed at the edge node 116, non-duplicate fragments can be transmitted to the master node 106. In another aspect, a de-duplication unit can be located at another computer device configured to perform a de-duplication operation on the master node 106 and/or edge node 116.

In one aspect, an example de-duplication operation can comprise identifying duplicate (e.g., similar, identical) content items, portions thereof, and/or fragments on the master node 106 and/or edge node 116. For example, the recording unit 108 can receive a request from more than one user device 102 to record a particular content item. A unique copy of the requested content item can be recorded and stored for each user device 102 and/or user requesting the content item. The fragments of each unique copy of the content item can be recorded and stored at the master node 106 and/or the edge node 116. As a further example, a user device 102 can request to record a first portion of the content item, and another user device 102 can request to record a second portion of the same content item. The first portion of the content item can comprise one or more similar or identical fragments as the second portion of the content item. Accordingly, the de-duplication operation can comprise identifying duplicate fragments (e.g., or other types of content portions or segments) among the unique copies of the content item stored at the request of the user devices 102.

In one aspect, duplicate fragments can be identified by comparing information stored in the one or more index files 114 and 122. For example, each unique copy of the content item and/or fragment can be associated with an index file. As another example, each unique copy can be listed and/or identified as a unique copy associated with a user. The unique copies can be listed, for example, in a user and/or subscriber management file and/or database. In one aspect, identifiers of the content fragments can be compared. For example, an identifier associated with a fragment in one index file can be compared to an identifier associated with a fragment in another index file. As a further example, a hash value associated with a fragment in one index file can be compared with a hash value associated with a fragment in another index file.

In one aspect, an example de-duplication operation can comprise removing duplicate content items and/or fragments from at least a part of (e.g., the content items at) the master node 106 and/or edge node 116. For example, if a de-duplication unit 124 identifies duplicate content items and/or fragments, the de-duplication unit 124 can remove one of the duplicate content items and/or fragments from the master node 106. Alternatively, the de-duplication unit 124 can move one of the duplicate content items and/or fragments to a storage archive 128 on the master node 106. Additionally, if a de-duplication unit 126 identifies duplicate content items and/or fragments, the de-duplication unit 126 can remove one of the content items and/or fragments from the edge node 116. For example, one of the duplicate fragments can be moved to the master node 106 (e.g., and stored with the first plurality of fragments 112, storage archive 128).

In one aspect, the de-duplication operation can comprise modifying a pointer related to a content item. For example, the pointer can identify a location of one or more fragments of a content item. For example, a pointer can indicate the location of a particular recording of a content item. In one aspect, the de-duplication operation can modify the pointer to identify a new location of the fragments or copy of fragments of the content item (e.g., if a de-duplication operation resulted in a content item or fragment being stored in a new or different location). As a further example, a user can be associated with a pointer to a recording of a content item. The pointer to the recording can comprise, for example, a title of the recording or other identifier. As fragments are moved, deleted, replaced, copied, and/or the like to new locations, the pointer can be updated to enable the user to access the content at the new location.

In one aspect, a de-duplication operation can be performed several times (e.g., at a variety of times by a variety of particular processes). For example, the de-duplication operation can be performed when content or another item (e.g., manifest file) is requested from another device (e.g., master node 106, edge node 116, user device 102). As another example, the de-duplication operation can be performed when a threshold condition is satisfied. A threshold condition can be satisfied when a certain amount of disk space is used, when a certain day or time is reached, when new content is available, and the like. As a further example, the de-duplication operation can be regularly performed as a background process.

In another aspect, the de-duplication operation can be performed on one or more files in a file system. For example, the de-duplication operation can be performed on hard linked files (e.g., pointer to a physical location on a disk) and soft linked files (e.g., a string of text that can locate a file on a disk). As another example, the de-duplication operation can comprise modifying one or more hard linked files to point to the same location on disk as other hard linked files.

The de-duplication operation can comprise modifying one or more hard linked files to soft linked files.

In one aspect, the request processing unit 120 can provide content that has been processed according to a de-duplication operation. For example, a first copy of the content item or portion of a content item can be recorded as a unique copy as requested by a user. A first index can be generated listing the fragments of the first copy. Another user can request the recording unit 108 to record a unique copy of the same content as a second copy of the content item. The recording unit 108 can record the same content as a second copy of the content item. In one aspect, the de-duplication operation can delete the first copy. The de-duplication operation can update the first index such that the first index points to the second copy (e.g., or fragments thereof) instead of the first copy. For example, corresponding (e.g., identical) fragments can be identified between the first copy and the second copy. The de-duplication operation can update the first index such that the locations of one or more fragments of the second copy are listed in the first index rather than the corresponding fragments of the first copy. Accordingly, upon receiving a request for the first copy, the request processing unit 120 can provide the second copy (e.g., or fragments thereof) to the user. It should be noted, in a similar way, the request processing unit 120 can provide fragments from one or more other copies (e.g., copies have corresponding fragments) to fulfill the request for the first copy.

In another aspect, the request processing unit 120 can re-create or otherwise generate the first copy by copying content and/or fragments identical or substantially similar to the content and/or fragments of the first copy to a specific location. For example, the fragments remaining from the de-duplication operation can comprise a master file. The master file can comprise one copy of all fragments from all of the recorded copies of the content. In one aspect, the master file can be stored at the master node 106. Accordingly, when a user requests the first copy, the master node 106 can provide fragments associated with the first copy from the master file. The fragments associated with the first copy can be stored together as a re-created or generated first copy. For example, when an edge node 116 receives a request for playback of the first copy from a user, the edge node 116 and/or master node 106 can re-create or otherwise generate the first copy based on the master file. Then, the edge node 116 can provide the re-created or generated first copy to the requesting user.

Figure 2:
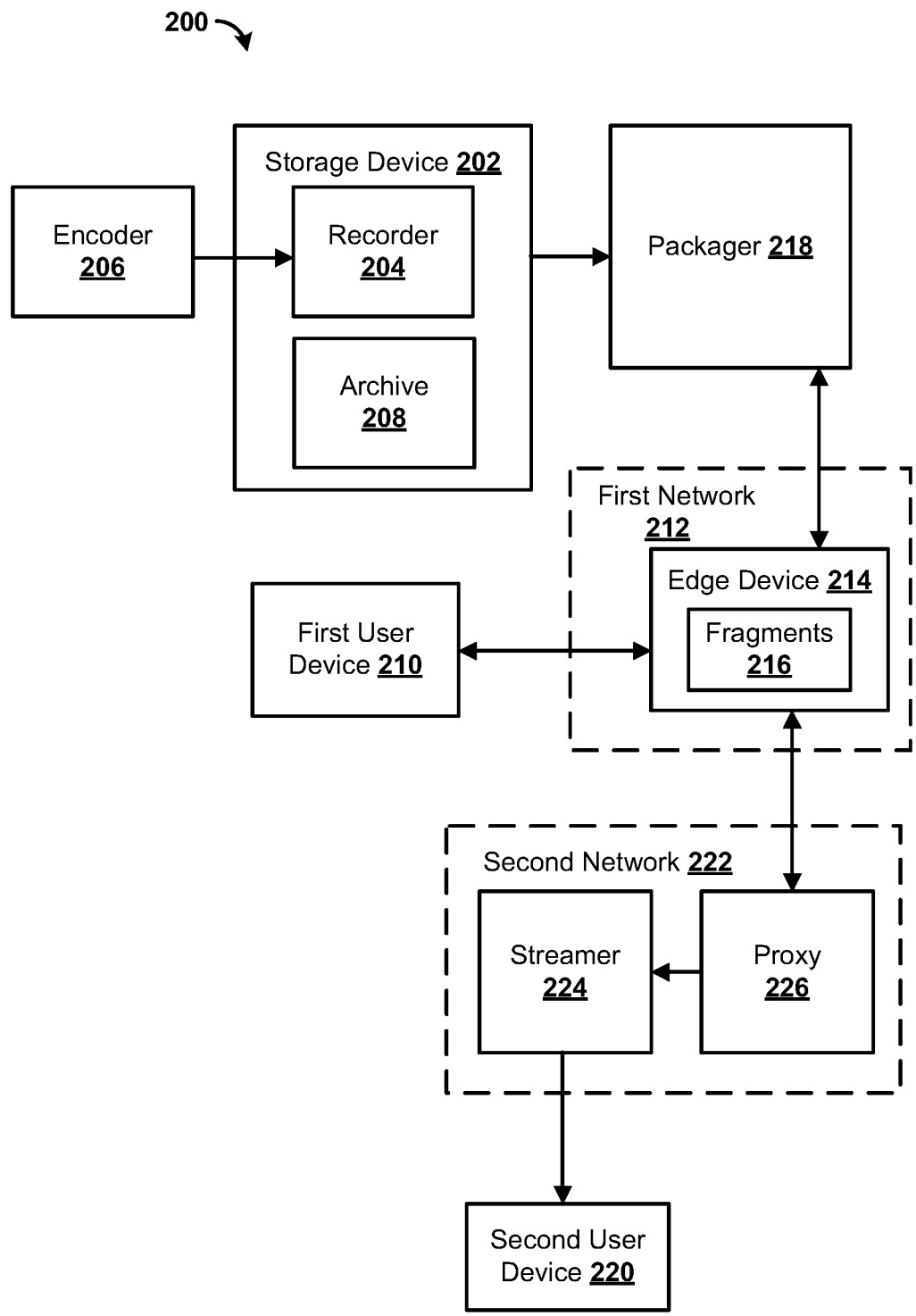
FIG. 2 is a block diagram illustrating another example system for content delivery.

FIG. 2 is a block diagram illustrating an example system 200 for providing data, such as content. In one aspect, the system 200 can comprise a storage device 202. The storage device can comprise a recorder 204 configured to record content items. For example, the recorder 204 can store fragments of content associated with a content item. The fragments of content can be received, for example, in a content stream from an encoder 206. In one aspect, the recorder 204 can comprise the recording unit 108 of FIG. 1. For example, the recorder 204 can generate index files with identifiers, such as MD5 hash values, associated with the fragments. The storage device 202 can also comprise an archive 208 configured for long-term storage of fragments of content. The archive 208 can receive fragments from the recorder 204 or other location. Additionally, in some cases, the same item of content can be recorded more than once. Accordingly, the recorder 204, archive 208, and/or other element of the system 200 can perform a de-duplication operation on the content items and/or fragments of content. In one aspect, the archive 208 can update the location of the fragments of data after the fragments are moved into the archive 208. For example, index files associated with the content items can be updated to reflect the new location.

In one aspect, the system 200 can comprise a first user device 210. The first user device 210 can be communicatively coupled to a first network 212. The first network 212 can be a packet-switched network (e.g., an internet protocol based network), a non-packet-switched network (e.g., quadrature amplitude modulation based network), and/or other network. In one aspect, the first user device 210 can be communicatively coupled to an edge device 214 located in the first network 212. The first network 212 can comprise a plurality of edge devices 214. In one aspect, each edge device 214 can function as a cache for storing fragments 216 of content at various locations through the network 212. In one aspect, the first user device 210 can request a manifest file associated with a content item from an edge device 214. Upon receiving the request for the manifest file, the edge device 214 can request the manifest file from a packager 218. Upon receiving the request for the manifest file, the packager 218 can request an index file from the recorder 204. The recorder 204 can provide the requested index file to the packager 218. The packager 218 can generate a manifest file based on the index file received from the recorder 204. The packager 218 can provide the manifest file to the edge device 214, and the edge device 214 can provide the manifest file to the first user device 210. In another aspect, the packager 218 can be implemented at the edge device 214. In such implementation, the recorder 204 can support standard HTTP 1.1 for both index file and fragment byte range requests from the packager 218.

In one aspect, the packager 218 can be configured to perform file fragmentation. For example, in some cases, content can be stored as complete files rather than fragments. For example, the complete files can be master files of content that are assembled based on one or more recorded copies of the content. Accordingly, the packager 218 can select portions of the complete files and encode the portions as fragments. The fragments can be encoded according to the encoding algorithms requested at the first user device 210 and/or second user device 220. In another aspect, the packager 218 can encrypt the fragments to allow for secure transmission of the fragments to the first user device 210 and/or second user device 220.

In one aspect, the first user device 210 can request a fragment from the edge device 214. For example, the fragment can be one of a plurality of fragments identified in the manifest file provided to the first user device 210. The edge device 214 can compare the fragment to the fragments 216 located at the edge device 214. For example, the edge device 214 can compare identifiers (e.g., MD5 hash values) of the fragments. If the edge device 214 locates the requested fragment at the edge device 214, then the fragment can be provided by the edge device 214. If the fragment is not located on the edge device, the edge device 214 can request the fragment from the packager 218. In this scenario, the packager 218 can retrieve the requested fragment from the storage device 202 and provide the fragment to the edge device 214. For example, the packager 218 can select a portion or all of a complete file on the storage device 202. Then the edge device 214 can provide the fragment to the first user device 210. The packager 218 and/or edge device 214 can re-create or otherwise generate a recorded copy of content associated with the first user device by retrieving the portions of the complete file associated with the recorded copy.

In one aspect, the system 200 can comprise a second user device 220. For example, the second user device 220 can be communicatively coupled to a second network 222. The second network 222 can comprise a non-packet switched network (e.g., quadrature amplitude modulation based network), a packet switched network (e.g., internet protocol based network), and/or other type of network. The second user device 220 can be configured to receive content through a quadrature amplitude modulation based network. In one aspect, the second user device 220 can comprise a set top box. The second user device 220 can initiate a session for receiving content from a streamer 224. In one aspect, the streamer 224 can be configured to transmit fragments as a continuous data stream at an appropriate rate for consumption to the first user device 210 and/or second user device 220. In one aspect, the streamer 224 can request an index file and content item. In response to the request from the streamer 224, a proxy 226 can request an index file and fragments associated with a content item. For example, the proxy 226 can request the index file and fragments from the edge device 214. The streamer 224 can receive the index file from the proxy 226 and provide a content stream to the second user device 220. In another aspect, the proxy 226 can by implemented as a part of the streamer 224. In such implementation, the streamer 224 can support HTTP 1.1. Additionally, the streamer 224 can parse the index files and generate small object requests to the edge device 214 directly.

Figure 3:
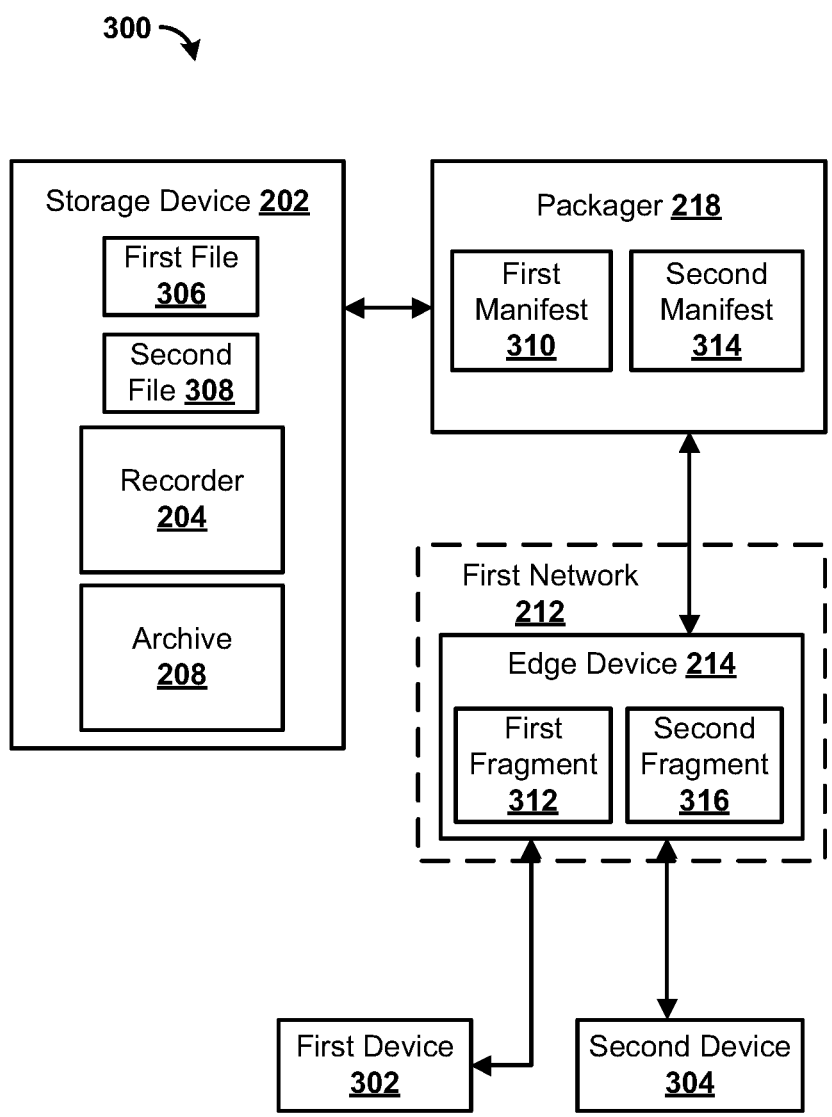
FIG. 3 is a block diagram illustrating another example system for content delivery.

FIG. 3 is a block diagram illustrating an example system 300 for providing data, such as content. In one aspect, a first device 302 and a second device 304 can request the recorder 204 to record the same program. The recorder 204 can capture a unique first file 306 for the first device 302 and a unique second file 308 for the second device 304 respectively (e.g., one file per streaming profile and/or user profile). Then, the recorder 204 can determine (e.g., calculate) fragment identifiers (e.g., hash values, MD5) and index files for each profile for each of the first device 302 and second device 304 (MD5 is included in the index file). The recorder 204 can archive the first file 306 and the second file 308 with index files into archive 208 with or without de-duplication. For example, the first file 306 and second file 308 can be stored as at least a portion of a master file. The master file can comprise, for example, one copy of each fragment from the first file 306 and second file 308 such that only one copy of a duplicate fragment found in both the first file and second file is stored as part of the master file.

In one aspect, data, such as content, can be provided to the first device 302. The first device 302 can request a first manifest file 310, for example, from the packager 218. The packager 218 can request index files from the recorder 204 (or, e.g., archive) and generate for the first device 302 a unique first manifest file 310 comprising at least some of the fragment identifiers from index files. The packager 218 can provide the first manifest file 310 to the first device 302. The first device 302 can request a first fragment 312 using http, for example, http://ndvr-origin/recordingIdA/format/fragmentNo/qualityLevel?programId=x&md5=y, where x and y can comprise any arbitrary values that can be parsed by the system, fragmentNo can comprise any appropriate fragment number, format can comprise any appropriate content format, recordingIdA can comprise any appropriate recording identifier, and ndvr-origin can identify any appropriate domain. The, edge device 214 can rewrite the URL to a different format, for example, to http://ndvr-origin/format/x/y. If the first fragment 312 is located at the edge device 214, the edge device 214 can respond with data to the client. If the first fragment 312 is not located at the edge device 214, the edge device 214 can request the first fragment 312 from the packager 218 using, for example, the following URL: http://ndvr-origin/recordingIdA/format/fragmentNo/qualityLevel?programId=x&md5=y. The packager 218 can identify a byte range (e.g., of the complete file or master file) associated with the first fragment 312 from recorder 204 based on the index files the packager 218 has retrieved previously. The packager 218 can provide the first fragment 312 to edge device 214. The edge device 214 can provide first fragment 312 to the first device 302 for playback. The edge device 214 can cache the first fragment 312, for example, as http://ndvr-origin/format/x/y. As fragments are retrieved from the storage device 202, a copy of an originally recorded file requested by the first device 302 can be re-created or otherwise generated.

In another aspect, content can be provided to the second device 304. For example, the second file 308 can request the second manifest file 314 from the packager 218. The packager 218 can request index files from recorder 204 (or, e.g., archive) and generate for the second content device 302 a unique second manifest file 314 including fragment MD5 from index files. The packager 218 can provide a unique second manifest file 314 to the second device 304. The second device 304 can request the first fragment 312, for example, using the following URL: http://ndvr-origin/recordingIdB/format/fragmentNo/qualityLevel?programId=x&md5=y. The second device 304 can have the unique recording identifier (e.g., recordingId) but have the same program identifier (e.g., programId) and format along with the same fragment MD5. The edge device 214 can rewrite the URL, for example, to http://ndvr-origin/format/x/y. The edge device 214 can locate the first fragment 312 on the edge device 214 since the edge device 214 already has that URL. The edge device 214 can respond with the first fragment 312 to the client. If the second device 304 reads further ahead in the sequence of fragments and requests a second fragment 316 (e.g., fragment block X) while the first device 302 is on fragment prior in sequence to the second fragment 316 (e.g., fragment blocks prior to block X), the edge device 214 may not be able to locate the second fragment 316 on the edge device 214. The edge device 214 can request the second fragment 316 from the storage device 202. The packager 218 can open the second file 308 and retrieve the second fragment 316. When the first device 302 eventually requests the second fragment 316, the programId/md5/format for the second fragment 316 can be already in a cache at the edge device 214.

Figure 4:
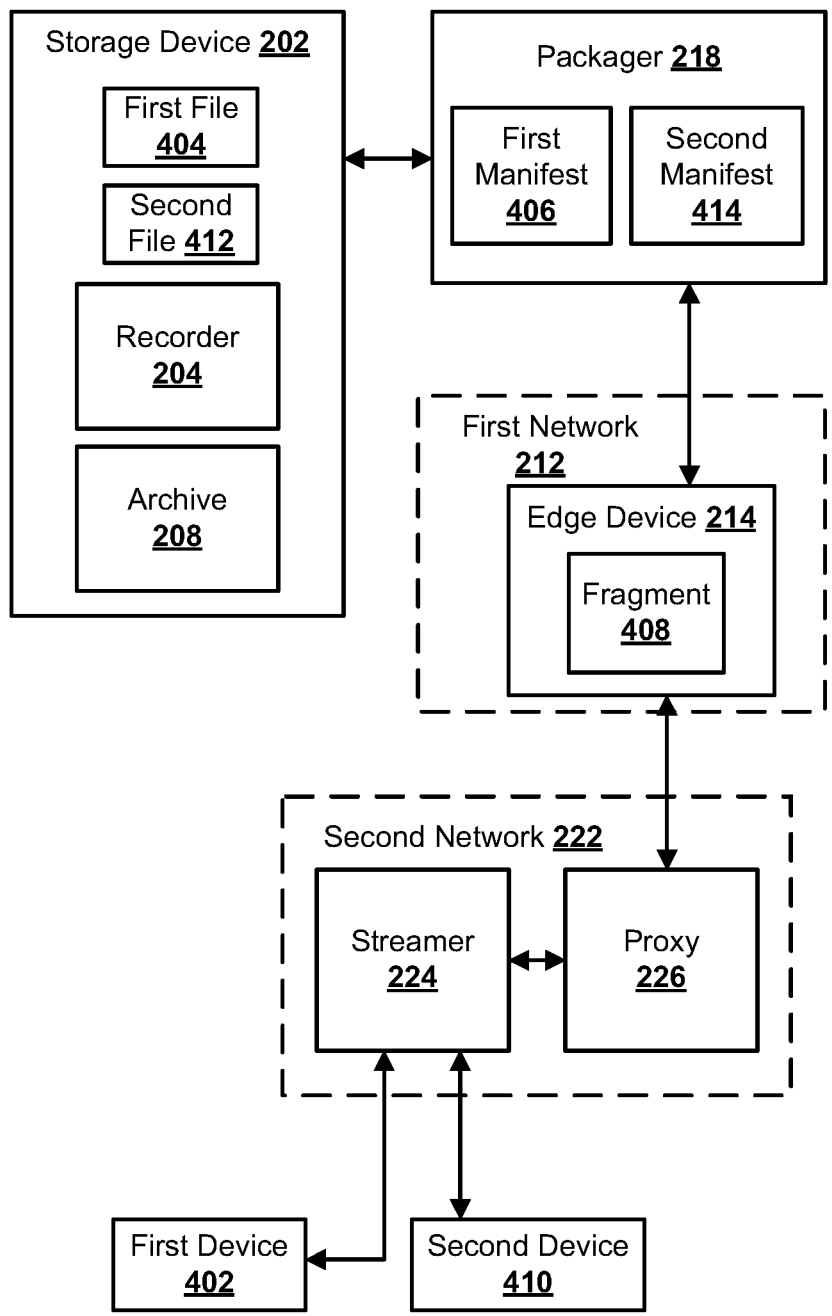
FIG. 4 is a block diagram illustrating yet another example system for content delivery.

FIG. 4 is a block diagram illustrating an example system 400 for providing content. In one aspect, QAM Playback can be provided for the first content device 402. The first content device 402 can request recording from the streamer 224 with a unique recording identifier (e.g., RecordingId) and content identifier (e.g., COID) for the first file 404. The streamer 224 can request an index file for the first file 404 from the proxy 226, and the proxy 226 can request the index file for the first file 404 from the packager 218. The packager 218 can request the index file from Recorder 204 as a QAM based first manifest file 406 and provide the first manifest file to the proxy 226 and then streamer 224. The streamer 224 can request the first file 404 from the proxy 226 using an HTTP byte range request or other type of request. The proxy 226 can break up requests into multiple fragment block requests based on the first manifest file 406. The proxy 226 can request fragment 408 using, for example, the following URL: http://ndvr-origin/COIDA/format/range-start/range-end?programId=x&md5=y. The edge device 214 can rewrite the URL, for example, to http://ndvr-origin/format/x/y. If the fragment 408 is located at the edge device 214, the edge device 214 can provide the fragment 408 to the proxy 226. The proxy 226 can provide the fragment 408 to the streamer 224. If the fragment 408 is not located at the edge device 214, the edge device 214 can request fragment 408 from packager 218 using, for example, the following URL: http://ndvr-origin/COIDA/format/range-start/range-end?programId=x&md5=y. The packager 218 can identify a byte range for fragment 408 from recorder 204 based on the index files the packager 218 has retrieved previously. The packager 218 can provide fragment 408 to the edge device 214, and the edge device 214 can send the fragment 408 to the proxy 226. The edge device 214 can cache the fragment 408, for example, as http://ndvr-origin/format/x/y.

In one aspect, the system 400 can provide QAM Playback to a second device 410. The second device 410 can request recording from streamer 224 with a unique recording identifier and a content identifier for the second device 410. The streamer 224 can request an index file associated with the second file 412 from the proxy 226, which can request the index file associated with the second file 412 from the packager 218. The packager 218 can request the index file from the recorder 204 as a QAM based second manifest file 414. The packager 218 can provide the second manifest file 414 to the proxy 226 and streamer 224. The streamer 224 can request the second file 412 from the proxy 226 using a HTTP byte range request or other request. The proxy 226 can break up requests into multiple fragment block requests based on the second manifest file 414. The proxy 226 can request fragment 408 using, for example, the following URL: http://ndvr-origin/COIDB/format/range-start/range-end?programId=x&md5=y. The edge device 214 can rewrite the URL, for example, to http://ndvr-origin/format/x/y. The edge device 214 can locate the fragment 408 on the edge device 214 if the edge device 214 already has that URL. The edge device 214 can provide fragment 408 to the proxy 226. The proxy 226 can provide the fragment to streamer 224 through a proxy transfer response.

Figure 5:
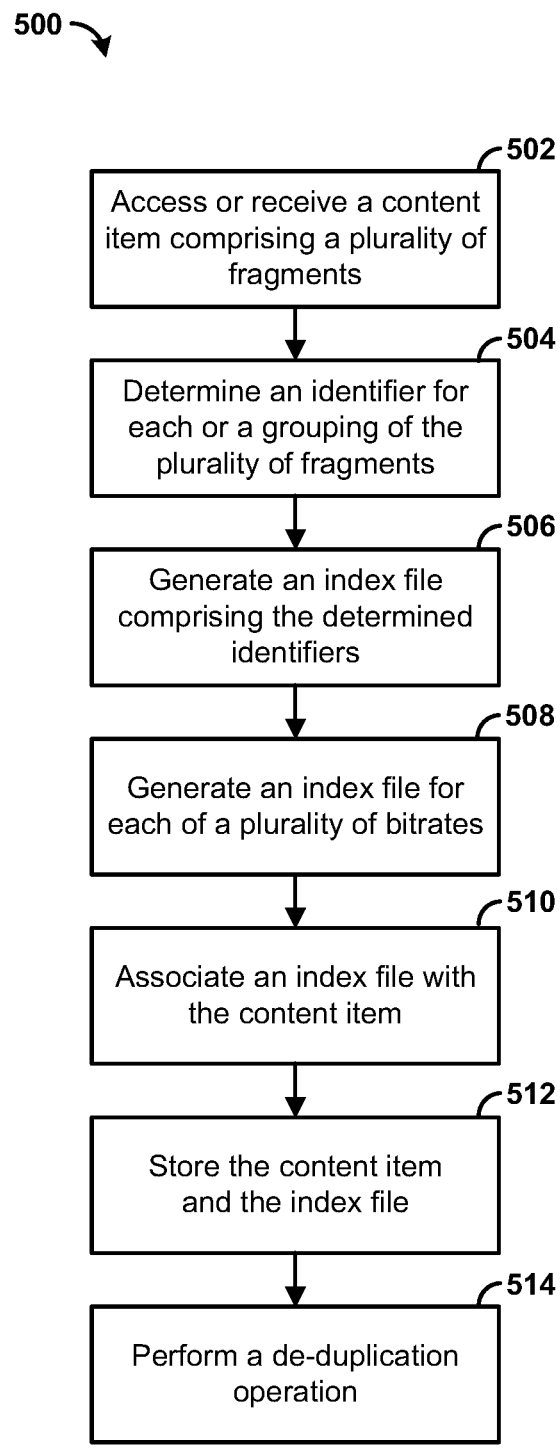
FIG. 5 is a flowchart illustrating an example method for content delivery.

FIG. 5 is a flowchart illustrating an example method 500 for content management and delivery. In step 502, a content item can be accessed or received. In one aspect, the content item can comprise a plurality of fragments. For example, the content item can be video, such as a movie or a television program. The content item can comprise images, video, audio, text, commentary, and the like. In step 504, an identifier can be determined for each or a grouping of the plurality of fragments. For example, the identifier can be based on a collision resistant hash function, such as an MD5 value. In step 506, an index file comprising the determined identifiers can be generated. In one aspect, the index file can be associated with a user (e.g., a particular subscriber account). In step 508, an index file can be generated for each of a plurality of bit-rates. In step 510, an index file (e.g., an index file generated in step 506 or 508) can be associated with the content item. In step 512, the content item and an index file (e.g., an index file generated in step 506 and/or 508) can be stored. In one aspect, storing the content item and the index file can be performed predictively. For example, the content item can be stored before a request is received or accessed from a user. The request can comprise an instruction to store at least a portion of the content item. For example, a certain portion of content currently being consumed or used by the user can be stored to enable manipulation (e.g., rewind, fast forward) of the content. Additionally, content can be stored predictively based on a user history, user preference, demographics, and/or other information.

In step 514, a de-duplication operation can be performed. In one aspect, the de-duplication operation can comprise any of the de-duplication operations performed by the de-duplication units (e.g., first de-duplication unit 124, second de-duplication unit 126) of FIG. 1. In an aspect, the de-duplication operation can comprise any other de-duplication operation described herein or known in the art. In one aspect, the de-duplication operation can be performed at one or more of a master node, an edge node, or a user device. For example, the de-duplication operation can be performed at an edge node, and non-duplicate fragments can be transmitted to a master node. The de-duplication operation can be performed on at least a portion of the content item. For example, the de-duplication operation can be performed on one or a plurality of fragments.

Figure 6:
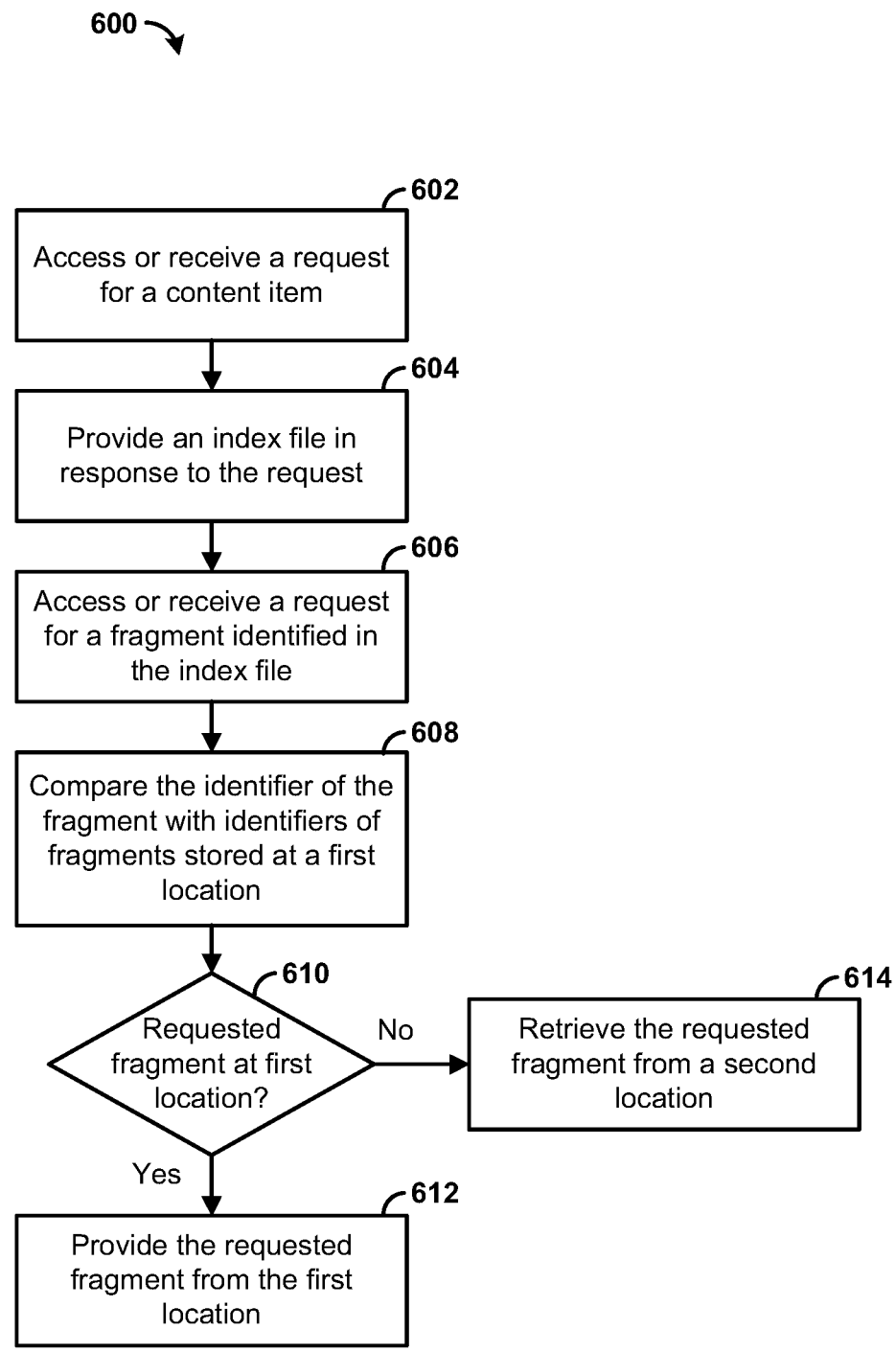
FIG. 6 is a flowchart illustrating another example method for content delivery.

FIG. 6 is a flowchart illustrating another example method 600 for content delivery. In one aspect, the example method 600 can be performed in succession to the example method 500. In step 602, a request for a content item (e.g., a request to consume the content item) can be accessed or received. In step 604, the index file can be provided in response to the request. As an example, a manifest file can be generated (e.g., or, if existing, accessed) based on the index file, and the manifest file can be provided to a user device. In step 606, a request for one of the plurality of fragments identified in the index file can be accessed or received. In step 608, the identifier of the requested fragment can be compared with identifiers of fragments stored at a first location. For example, the identifier can be based on a collision resistant hash function, such as an MD5 value. In step 610, it can be determined if the requested fragment is located at the first location. If the fragment is located at the first location, then the method can proceed to step 612. In step 612, the requested fragment can be provided from the first location. If the fragment is not located at the first location, then the method 600 can proceed to step 614. In step 614, the requested fragment can be retrieved from the first location or a second location. For example, the fragments can be stored as part of a master file at the second location. In one aspect, the master file can be a file comprising all the fragments (e.g., without duplicating fragments) of one or more recorded copies of content. The master file can comprise, for example, only one copy of each fragment found in the one or more recorded copies of content. As a further example, fragments found (e.g., as identical or corresponding copies) in one or more recorded copies of content can be stored as a single copy of the fragment. The requested fragment can be retrieved by selecting a portion (e.g., identified by a byte range) of the master file, and the portion of the master file can be provided as the requested fragment.

In one aspect of step 614, the requested fragment can be reconstituted into a unique file at the first location or the second location. For example, the requested fragment can be retrieved from the master file. Then, the requested fragment can be associated with one or more other fragments associated with a unique file. The unique file can comprise fragments of a content item requested by a user to be recorded. The request for the fragment can be based on a request from a user to access the unique file. The master file can be a file generated based on a de-duplication operation on one or more recorded files.

Figure 7:
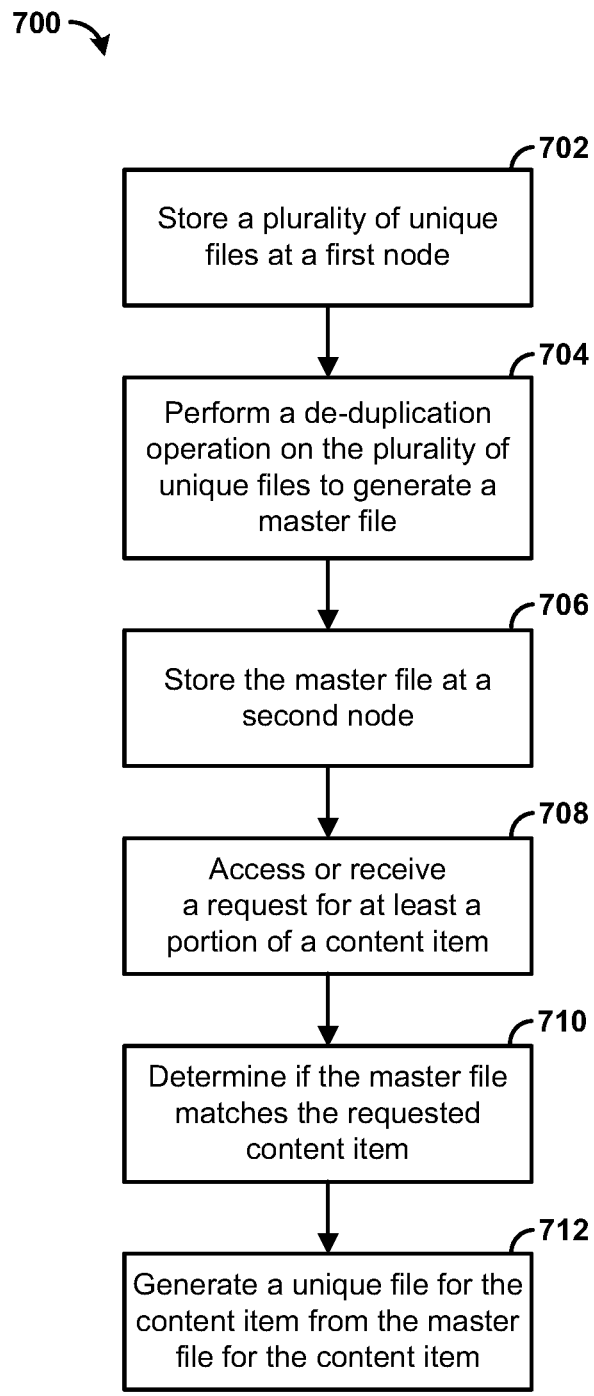
FIG. 7 is a flowchart illustrating yet another example method for content delivery.

FIG. 7 is a flowchart illustrating yet another example method 700 for content delivery. In step 702, a plurality of unique files can be stored at a first node. At least a portion of the plurality of unique files can be associated with corresponding unique users. In one aspect, each of the plurality of unique files can comprise a different recording of a content item. In another aspect, each of the plurality of unique files can comprise a content fragment of a content item, or content fragments of multiple content items.

In step 704, a de-duplication operation can be performed on the plurality of unique files. For example, the de-duplication operation can generate a master file for the content item. For example, a master file can be a file comprising all the fragments (e.g., without duplicating fragments) of one or more recorded copies (e.g., unique files) of content. The master file can comprise, for example, only one copy of the fragments found in the one or more recorded copies (e.g., unique files) of content. As a further example, fragments found (e.g., as identical or corresponding copies) in one or more recorded copies of content can be stored as a single copy of the fragment (e.g., in the master file). In one aspect, the de-duplication operation can comprise any of the de-duplication operations performed by the de-duplication units (e.g., first de-duplication unit 124, second de-duplication unit 126) of FIG. 1. The de-duplication operation can comprise any other de-duplication operation described herein. The de-duplication operation can be performed at a first node, second node, or other node. In one aspect, the first node can be an edge node and the second node can be a master node. In another aspect, the first node can be an intermediate node between an edge node and the master node. The first node can also be a user device and the second node can be an edge node. Accordingly, the de-duplication operation can be performed at one or more of the master node, the edge node, a user device (e.g., gateway, customer premises equipment, digital video recorder), or other device located in a distribution network and/or access network. In another aspect, the de-duplication operation can be performed on at least a portion of a content item. For example, the de-duplication operation can be performed on a plurality of fragments. As a further example, the de-duplication operation can be performed at the second node and non-duplicate fragments can be transmitted to the first node.

In step 706, the master file for the content item can be stored at the second node. The second node can be upstream of the first node. In step 708, a request from a user for at least a portion of the content item can be accessed and/or received. For example, the user can request access to a recording previously performed for a user. In step 710, it can be determined if the master file matches the requested content item. For example, an identifier associated with the content item can be compared with an identifier associated with the master file. For example, the identifier can be based on a collision resistant hash function, such as an MD5 value.

In step 712, a unique file for the content item can be generated from the master file for the content item. In one aspect, the unique file can be associated with the user (e.g., user requesting at least a portion of the content item). In step 712, the matching master file (e.g., master file that matches the content item) or a portion thereof can be distributed (e.g., the master file or a portion thereof) to a second node. In step 712, the master file can be processed (e.g., reconstituted) to become one or multiple unique files. For example, the master file can be accessed at the second node as a unique file associated with a user (e.g., subscriber). For example, the unique file can be associated with at least one of a content identifier, user identifier, recording identifier, and other identifiers. The content identifier can identify a specific content item, such as a show, movie, or broadcast. The user identifier (e.g., subscriber identifier) can identify a user or subscriber (e.g., who requested the recording). The recording identifier can identify a particular recording of all or part of a content item. The content identifier, user identifier, recording identifiers, and other identifiers can be located in an index file, database, manifest file, or other file configured to maintain the information that describes the uniqueness of the file. For example, the content identifier, user identifier, and recording identifier can be associated with one or more fragments of the master file. The unique file can comprise the portion (e.g., fragments) of the master file corresponding to a portion of content that a user (e.g., subscriber) requested to be stored or recorded. Additionally, the master file can be converted to a unique bitrate profile. For example, the unique file can comprise a portion of the master file converted to the unique bit rate profile. The unique bit rate file can be associated with the user who requested the portion of the content to be stored or recorded. In one aspect, several nodes may be traversed between the first node and second node.

Figure 8:
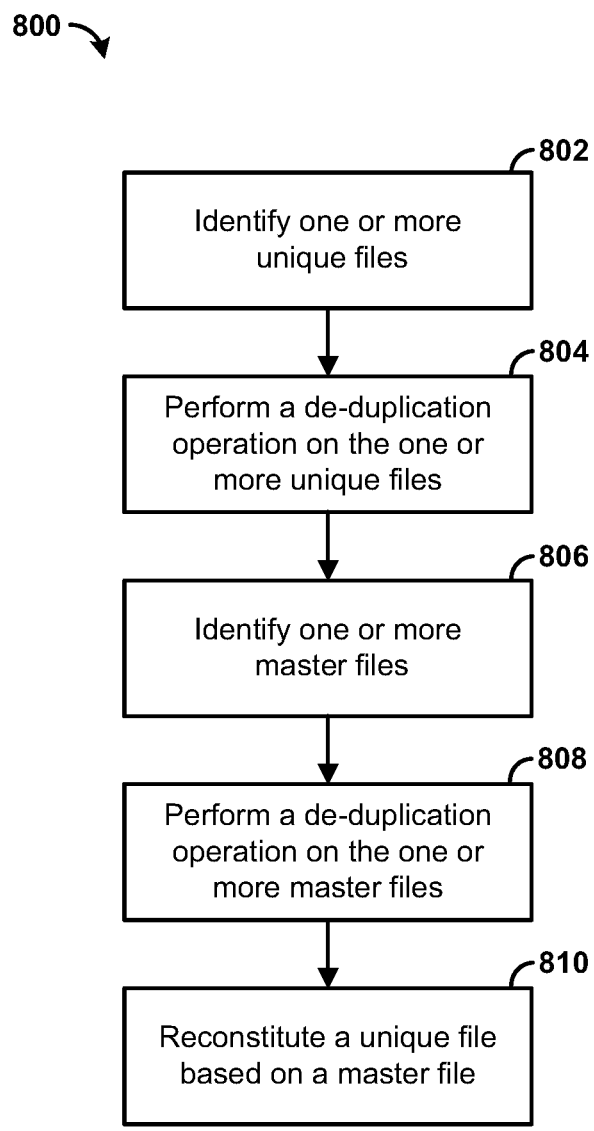
FIG. 8 is a flowchart illustrating an example method for content management and delivery.

FIG. 8 is a flowchart of an example method 800 for content management and delivery. In step 802, one or more unique files can be identified. For example, the one or more unique files can be received or accessed. The unique files can be received onto one or more devices. The unique files can be unique recordings of a content item (e.g., show, movie, broadcast, and the like). The unique files can be associated with one or more users (e.g., subscribers) who requested recording of the unique files. For example, the unique files can be associated with at least one of a content identifier, user identifier, recording identifier, and other identifiers. The content identifier can identify a specific content item, such as a show, movie, or broadcast. The user identifier (e.g., subscriber identifier) can identify a user or subscriber (e.g., who requested the recording). The recording identifier can identify a particular recording of all or part of a content item. The content identifier, user identifier, recording identifiers, and other identifiers can be located in an index file, database, manifest file, or other file configured to maintain the information that describes the uniqueness of the file. For example, the content identifier, user identifier, and recording identifier can be associated with one or more fragments of the master file.

In one aspect, the unique files can comprise one or more of the same or duplicate fragments as other unique files. In step 804, a de-duplication operation can be performed on the one or more unique files. For example, de-duplication operation can be performed on the one or more unique files to create one or more master files. The master files can be based on the one or more unique files. In one aspect, the de-duplication operation can comprise any of the de-duplication operations performed by the de-duplication units (e.g., first de-duplication unit 124, second de-duplication unit 126) of FIG. 1. The de-duplication operation can comprise any other de-duplication operation described herein. For example, duplicate fragments associated with more than one unique file can be deleted so that one copy of the duplicate fragment remains among the unique files. The remaining non-duplicate fragments can be stored as a master file. In one aspect, the de-duplication operation can update an index file, database, manifest file, or other file configured to describe or identify a unique file. The index file, database, manifest file, or other file can be updated such that the non-duplicate fragments of the master file are identified as a part of the unique file. Accordingly, a fragment in a master file can be identified as a part of more than one unique file.

In step 806, one or more master files can be identified. For example, the one or more master files can be accessed or received. For example, several downstream devices can provide the master files to an upstream device. An upstream device can be a more geographically centralized device of a content provider. In contrast, a downstream device can be a device more geographically dispersed from an upstream device. In another aspect, an upstream device can be a device from which content and other services are delivered to a variety of downstream devices. The content and other services can be delivered to the downstream devices for eventual consumption by users, such as content subscribers.

In step 808, a de-duplication operation can be performed on one or more master files. In one aspect, the de-duplication operation can comprise any of the de-duplication operations performed by the de-duplication units (e.g., first de-duplication unit 124, second de-duplication unit 126) of FIG. 1. The de-duplication operation can comprise any other de-duplication operation described herein. In one aspect, the de-duplication operation can be performed on at least a portion of the content item. For example, the de-duplication operation can be performed on a plurality of fragments. As an illustration, duplicate fragments associated with more than one master file can be deleted so that one copy of the duplicate fragment remains among the master files at a particular device. In one aspect, the remaining non-duplicate fragments from the master files can be stored as a de-duplicated master file. Furthermore, the de-duplicated master file can be transmitted upstream for storage and/or for further de-duplication operations with other de-duplicated master files, for example, to further consolidate the data fragments at a more centralized location. The de-duplication operation can be performed at one or more of a master node or an edge node. The de-duplication operation can be performed at the edge node and non-duplicate fragments can be transmitted to the master node.

In step 810, a unique file can be reconstituted and/or generated based on a master file or de-duplicated master file. For example, a master file can comprise a plurality of fragments. Reconstituting the unique file of the one or more unique files based on the master file can comprise providing a portion of the plurality of fragments associated with a user as a unique file. As another example, a master file or de-duplicated master file can be processed to generate a unique file. In one aspect, the index file, database, manifest file, or other file can be accessed to identify the fragments of a master file or de-duplicated master file that together constitute the unique file. The identified fragments can be copied and provided together as the reconstituted unique file. The unique file can be provided to a downstream device for delivery of the unique file to a user. In one aspect, the unique file can be reconstituted after receiving a request for the unique file. For example, the request can be received from the user.

Figure 9:
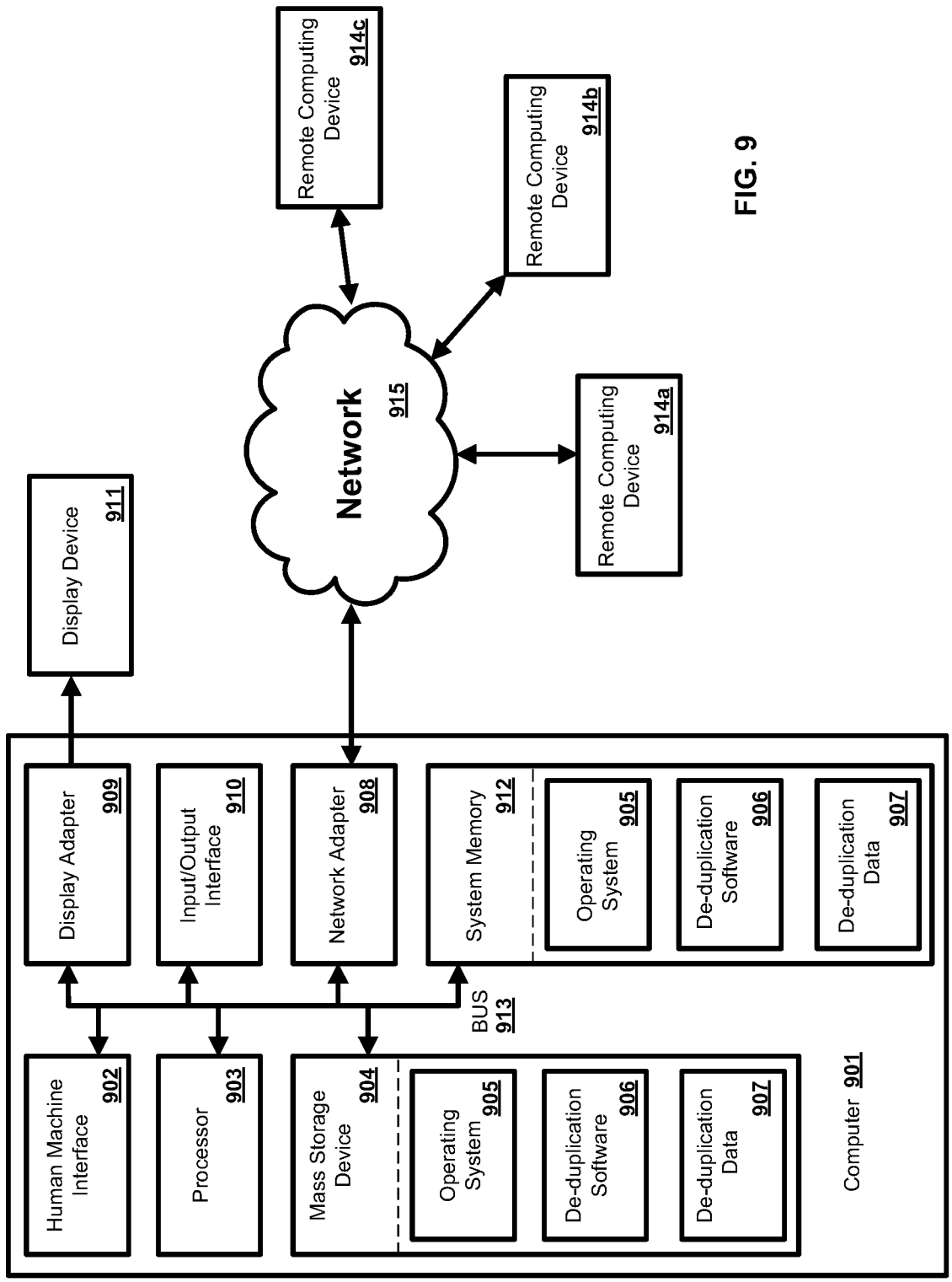
FIG. 9 is a block diagram illustrating an example computing device for implementing the methods and systems described herein.

In an exemplary aspect, the methods and systems can be implemented on a computer 901 as illustrated in FIG. 9 and described below. By way of example, master node 106 and edge node 116 of FIG. 1 can be computers as illustrated in FIG. 9. Similarly, the methods and systems disclosed can utilize one or more computers to perform one or more functions in one or more locations. FIG. 9 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, tablet devices, smart phones, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 901. The components of the computer 901 can comprise, but are not limited to, one or more processors or processing units 903, a system memory 912, and a system bus 913 that couples various system components including the processor 903 to the system memory 912. In the case of multiple processing units 903, the system can utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB), Advanced Microcontroller Bus Architecture (AMBA), Front Side Bus (FSB), and the like. The bus 913, and all buses specified in this description can also be implemented over a wired or wireless network connection and each of the subsystems, including the processor 903, a mass storage device 904, an operating system 905, de-duplication software 906, de-duplication data 907, a network adapter 908, system memory 912, an Input/Output Interface 910, a display adapter 909, a display device 911, and a human machine interface 902, can be contained within one or more remote computing devices 914*a,b,c* at physically separate locations, connected through buses of this form or through networking protocols, in effect implementing a fully distributed system.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM) or flash memory. The system memory 912 typically contains data such as de-duplication data 907 and/or program modules such as operating system 905 and de-duplication software 906 that are immediately accessible to and/or are presently operated on by the processing unit 903.

In another aspect, the computer 901 can also comprise other removable/non-removable, volatile/non-volatile computer storage media. By way of example, FIG. 9 illustrates a mass storage device 904 which can provide non-volatile storage of computer code, computer readable instructions, data structures, program modules, and other data for the computer 901. For example and not meant to be limiting, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and de-duplication software 906. Each of the operating system 905 and de-duplication software 906 (or some combination thereof) can comprise elements of the programming and the de-duplication software 906. De-duplication data 907 can also be stored on the mass storage device 904. De-duplication data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 901 via an input device (not shown). Examples of such input devices comprise, but are not limited to, a keyboard, pointing device (e.g., a "mouse"), a microphone, a joystick, a scanner, tactile input devices such as gloves, and other body coverings, a touchscreen, and the like These and other input devices can be connected to the processing unit 903 via a human machine interface 902 that is coupled to the system bus 913, but can be connected by other interface and bus structures, such as a parallel port, game port, an IEEE 1394 Port (also known as a FireWire port), a serial port, or a universal serial bus (USB).

In yet another aspect, a display device 911 can also be connected to the system bus 913 via an interface, such as a display adapter 909. It is contemplated that the computer 901 can have more than one display adapter 909 and the computer 901 can have more than one display device 911. For example, a display device can be a monitor, an LCD (Liquid Crystal Display), or a projector. In addition to the display device 911, other output peripheral devices can comprise components such as speakers (not shown) and a printer (not shown) which can be connected to the computer 901 via Input/Output Interface 910. Any step and/or result of the methods can be output in any form to an output device. Such output can be any form of visual representation, including, but not limited to, textual, graphical, animation, audio, tactile, and the like. The display 911 and computer 901 can be part of one device, or separate devices.

The computer 901 can operate in a networked environment using logical connections to one or more remote computing devices 914a,b,c. By way of example, a remote computing device can be a personal computer, portable computer, smartphone, a server, a router, a network computer, a peer device or other common network node, and so on. Logical connections between the computer 901 and a remote computing device 914a,b,c can be made via a network 915, such as a local area network (LAN) and/or a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components reside at various times in different storage components of the computing device 901, and are executed by the data processor(s) of the computer. An implementation of de-duplication software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving, by a computing device, a request for recorded content;
   determining, based on the request, a first index file, of a plurality of index files associated with the recorded content, that comprises a fragment identifier corresponding to a first fragment of the recorded content, wherein the fragment identifier is unique to the first index file, wherein the first index file associates the fragment identifier with a master file of the recorded content, wherein the master file includes a second fragment of the recorded content that lacks a corresponding reference in the first index file;
   determining, based on the first index file and the master file, a plurality of fragments, including the first fragment and excluding the second fragment, of the recorded content indicated by the master file; and
   causing, based on the master file indicating the plurality of fragments are stored at a first storage node, the first storage node to send the plurality of fragments.

2. The method of claim 1, wherein the request comprises the fragment identifier.

3. The method of claim 1, wherein the fragment identifier uniquely identifies at least one of: a user profile, a user account, or a user device associated with the request.

4. The method of claim 1, wherein the master file identifies the first storage node.

5. The method of claim 1, further comprising:
   generating, based on the master file and the first index file, a first unique file comprising at least one portion of the recorded content; and
   sending, to a user device associated with the request, the first unique file for playback.

6. The method of claim 1, further comprising: sending, by the first storage node to a user device, at least one portion of the recorded content.

7. The method of claim 6, wherein the user device is associated with at least one of: the request or the first index file.

8. A method comprising:
   receiving, by a computing device, a request for recorded content;
   determining, based on the request, a first index file, of a plurality of index files associated with the recorded content, that comprises a fragment identifier corresponding to a first fragment of the recorded content, wherein the fragment identifier is unique to the first index file, wherein the first index file associates the fragment identifier with a master file of the recorded content, wherein the master file includes a second fragment of the recorded content that lacks a corresponding reference in the first index file;
   determining, based on the first index file and the master file, a plurality of fragments, including the first fragment and excluding the second fragment, of the recorded content indicated by the master file; and
   sending, based on the request, the plurality of fragments.

9. The method of claim 8, wherein at least one of: the first index file or the fragment identifier are associated with a user device, and wherein sending the plurality of fragments comprises sending, to the user device, the plurality of fragments.

10. The method of claim 8, wherein the fragment identifier uniquely identifies at least one of: a user profile, a user account, or a user device associated with the request.

11. The method of claim 8, wherein the computing device comprises a first edge node.

12. The method of claim 11, wherein the master file identifies the first edge node.

13. The method of claim 8, wherein sending the plurality of fragments comprises generating, based on the master file and the first index file, a first unique file comprising at least one portion of the recorded content.

14. The method of claim 8, wherein sending the plurality of fragments comprises:
   causing a second computing device to generate, based on the master file and the first index file, a first unique file comprising at least one portion of the recorded content; and
   causing the second computing device to send the first unique file to a user device associated with the request.

15. An apparatus comprising:
   one or more processors; and
   a memory storing processor-executable instructions that, when executed by the one or more processors, cause the apparatus to:
      receive a request for recorded content;
      determine, based on the request, a first index file, of a plurality of index filesassociated with the recorded content, that comprises a fragment identifier corresponding to a first fragment of the recorded content, wherein the fragment identifier is unique to the first index file, wherein the first index file associates the fragment identifier with a master file of the recorded content, wherein the master file includes a second fragment of the recorded content that lacks a corresponding reference in the first index file;
      determine, based on the first index file and the master file, a plurality of fragments, including the first fragment and excluding the second fragment, of the recorded content indicated by the master file; and
      cause, based on the master file indicating the plurality of fragments are stored at a first storage node, the first storage node to send the plurality of fragments.

16. The apparatus of claim 15, wherein the request comprises the fragment identifier.

17. The apparatus of claim 15, wherein the fragment identifier uniquely identifies at least one of: a user profile, a user account, or a user device associated with the request.

18. The apparatus of claim 15, wherein the master file identifies the first storage node.

19. The apparatus of claim 15, wherein the processor-executable instructions further cause the apparatus to generate, based on the master file and the first index file, a first unique file comprising at least one portion of the recorded content.

20. The apparatus of claim 19, wherein the processor-executable instructions further cause the apparatus to send, to a user device associated with the request, the first unique file for playback.

* * * * *